US012561985B2

(12) United States Patent
Yim et al.

(10) Patent No.: US 12,561,985 B2
(45) Date of Patent: Feb. 24, 2026

(54) APPARATUS FOR CONTROLLING VEHICLE INCLUDING CAMERA AND METHOD FOR THE SAME

(71) Applicants: Hyundai Motor Company, Seoul (KR); Kia Corporation, Seoul (KR); Industry-University Cooperation Foundation Hanyang University (IUCF-HYU), Seoul (KR)

(72) Inventors: Chung Sik Yim, Anyang-si (KR); Soo Bok Kim, Incheon (KR); Hyung In Yun, Seoul (KR); Jun Won Choi, Seoul (KR); Jun Ho Koh, Seoul (KR); Young Woo Lee, Seoul (KR); In Young Yoon, Paju-si (KR)

(73) Assignees: Hyundai Motor Company, Seoul (KR); Kia Corporation, Seoul (KR); Industry-University Cooperation Foundation Hanyang University (IUCF-HYU), Seoul (KR)

( * ) Notice: Subject to any disclaimer, the term of this patent is extended or adjusted under 35 U.S.C. 154(b) by 466 days.

(21) Appl. No.: 17/986,091

(22) Filed: Nov. 14, 2022

(65) Prior Publication Data
US 2023/0316771 A1      Oct. 5, 2023

(30) Foreign Application Priority Data
Mar. 30, 2022    (KR) ........................ 10-2022-0039882

(51) Int. Cl.
*G06V 20/58* (2022.01)
*B60Q 9/00* (2006.01)
(Continued)

(52) U.S. Cl.
CPC ............. *G06V 20/58* (2022.01); *B60Q 9/008* (2013.01); *G06T 7/50* (2017.01); *G06T 7/70* (2017.01);
(Continued)

(58) Field of Classification Search
CPC ...... G06V 20/58; G06V 20/64; G06V 20/647; B60Q 9/008; B60Q 9/002; B60Q 9/005;
(Continued)

(56) References Cited

U.S. PATENT DOCUMENTS 9,994,148 B1* 6/2018 Kim ........................ B60Q 5/006
2011/0295469 A1* 12/2011 Rafii ........................ E05F 15/43
701/49

(Continued)

FOREIGN PATENT DOCUMENTS

CN 111950428 A * 11/2020 ............. G06F 18/23
JP 2017-149212 A 8/2017
(Continued)

OTHER PUBLICATIONS

Chang et al. "A Deep Learning-Based Intelligent Anti-Collision System for Car Door," *IEEE 9th Global Conference Electronics (GCCE)*, p. 148-149 (2020).
(Continued)

*Primary Examiner* — Matthew C Bella
*Assistant Examiner* — Nicholas John Helco
(74) *Attorney, Agent, or Firm* — MORGAN, LEWIS & BOCKIUS LLP

(57) ABSTRACT
An apparatus of controlling a vehicle and a method for controlling the same includes a camera, a processor operatively connected to the camera, and a storage operatively connected to the processor to store instructions executed by the processor. The processor obtains an image of a surrounding of a door of the vehicle, which is captured through the
(Continued)

501

502 camera, obtains depth information from the obtained image, transforms the depth information into three dimensional (3D) point information, determines collision possibility of the door with an obstacle, based on distribution of the 3D point information to determine collision possibility, and warns the collision of the door when the collision possibility is present, when executing the instructions.

16 Claims, 7 Drawing Sheets

(51) Int. Cl.
    *G06T 7/50*           (2017.01)
    *G06T 7/70*           (2017.01)

(52) U.S. Cl.
    CPC .............. *G06T 2207/10028* (2013.01); *G06T 2207/30261* (2013.01)

(58) Field of Classification Search
    CPC .. B60Q 9/007; G06T 7/50; G06T 7/70; G06T 2207/10028; G06T 2207/30261; G06T 2207/20084; G06T 2207/10016; G06T 2207/30164; G06T 2207/30248; G06T 2207/30252; H04N 7/181; H04N 7/18; H04N 23/00; B60W 30/08; B60W 50/14; B60W 2050/0005; B60W 2050/143; B60W 2420/403; B60W 30/025; B60W 30/085; B60W 30/09; B60W 2050/0037; B60W 50/0097; B60W 60/0011; B60W 60/0015; B60W 2422/95; B60W 50/12; B60K 28/12; B60K 35/00; B60K 35/28; B60Y 2302/03; F02N 2200/0815

See application file for complete search history.

(56) References Cited

U.S. PATENT DOCUMENTS

| | | | |
|---|---|---|---|
| 2020/0104612 A1* | 4/2020 | Chen ........................ | G01S 17/42 |
| 2020/0324761 A1* | 10/2020 | Magzimof ............ | B60W 30/09 |
| 2021/0173415 A1* | 6/2021 | Cajias .................... | G06V 10/95 |
| 2021/0178966 A1 | 6/2021 | Burtch | |
| 2021/0303878 A1* | 9/2021 | Hori .......................... | G06T 7/70 |
| 2023/0042756 A1* | 2/2023 | Song ...................... | G06V 10/25 |
| 2023/0289980 A1* | 9/2023 | Yamamoto ............. | G06V 20/58 |

FOREIGN PATENT DOCUMENTS

| | | | | |
|---|---|---|---|---|
| JP | 2020-201881 A | 12/2020 | | |
| JP | 2021-154969 A | 10/2021 | | |
| KR | 10-2014-0080048 A | 6/2014 | | |
| KR | 20160136757 A | * 11/2016 | ............. | G08G 1/165 |

OTHER PUBLICATIONS

Liu et al. "A Radar-Based Door Open Warning Technology for Vehicle Active Safety," *International Conference on Information System and Artificial Intelligence*, p. 479-484 (2016).

* cited by examiner

APPARATUS FOR CONTROLLING VEHICLE INCLUDING CAMERA AND METHOD FOR THE SAME

CROSS-REFERENCE TO RELATED APPLICATION

The present application claims priority to Korean Patent Application No. 10-2022-0039882, filed on Mar. 30, 2022, the entire contents of which is incorporated herein for all purposes by this reference.

BACKGROUND OF THE PRESENT DISCLOSURE

Field of the Present Disclosure

The present disclosure relates to an apparatus of controlling a vehicle including a camera and a method for the same, and more particularly, relates to a technology of notifying collision between a door and an obstacle in advance, based on information on an image captured through a camera, when a swing door of a vehicle is to open or closed.

Description of Related Art

There is required a technology of sensing an obstacle around a door and notifying a collision risk to prevent the collision with the obstacle, when a door of a vehicle employing a swing door technology is to open or closed, For example, various sensors, such as a radar sensor or a light detection and ranging (LiDAR) sensor, have been employed to detect an obstacle and to obtain information on the distance between the obstacle and a door. Although information on three dimensional (3D) points for the obstacle and the door is directly obtained when the radar sensor or the LiDAR sensor is employed, higher costs are required. Accordingly, there needs an algorithm of preventing collision based on a lower-price camera.

A structure from motion (SFM) algorithm is to estimate the depth through a camera without employing a deep-learning scheme, and to estimate 3D structure information based on images having mutually different viewing points, by use of movement information of the camera in a screen. When the SFM algorithm is employed, the size of each object on the image may not be exactly detected. Accordingly, the depth may not be exactly estimated.

An object detecting algorithm based on deep-learning using a red-green-blue (RGB) image is to detect an obstacle through the camera. When the object detecting algorithm based on deep-learning is employed, a distance to the object may not be recognized, and the door may be controlled so that the door is not open, even under an unnecessary situation.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of controlling a vehicle, configured for exactly estimating the depths of a door and an obstacle through a camera and of preventing the collision between the door and the obstacle, and a method for the same.

Another aspect of the present disclosure provides an apparatus of controlling a vehicle, configured for ensuring the security of an occupant and a pedestrian, when a door of a vehicle employing a power swing door technology is open or closed, and of reducing an accident rate when the occupant gets on or off, and a method for the same.

Another aspect of the present disclosure provides an apparatus of controlling a vehicle, configured for more exactly predicting the collision possibility of the door and the obstacle, and a method for the same.

The technical problems to be solved by the present disclosure are not limited to the aforementioned problems, and any other technical problems not mentioned herein will be clearly understood from the following description by those skilled in the art to which the present disclosure pertains.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of controlling a vehicle may include a camera, a processor operatively connected to the camera, and a storage operatively connected to the processor to store instructions executed by the processor. The processor may obtain an image of a surrounding of a door of a vehicle, which is captured through the camera, may obtain depth information from the obtained image, may transform the depth information into three dimensional (3D) point information, may determine collision possibility of the door by determining collision possibility of the door with the obstacle, based on distribution of the 3D point information, and may warn the collision of the door when the collision possibility is determined as being present, when executing the instructions.

According to an exemplary embodiment of the present disclosure, the processor may obtain the 3D point information by use of the depth information and a parameter of the camera when executing the instructions, and the parameter may include a focal length and coordinates of a principal point.

According to an exemplary embodiment of the present disclosure, the processor may obtain the 3D point information through following Equation 1, Equation 2, and Equation 3, $$x = ((px - cx)/fx) \cdot pz, \qquad \text{Equation 1,}$$

$$y = ((py - cy)/fy) \cdot pz, \text{ and} \qquad \text{Equation 2,}$$

$$z = pz, \qquad \text{Equation 3,}$$

in which 'x', 'y', and 'z' represent coordinates of a 3D point, 'px' and 'py' represent coordinates of each pixel contained in the depth information, 'cx' and 'cy' represent coordinates of a principal point, and 'fx' and 'fy' represent focal lengths, and 'pz' represents a depth value predicted with respect to the pixel, when executing the instructions.

According to an exemplary embodiment of the present disclosure, the processor may set a collision sensing zone for the door by use of the 3D point information, may determine the number of 3D points corresponding to an obstacle entering the collision sensing zone, and may warn the collision of the door, when the determined number of 3D points is equal to or greater than a predetermined number, when executing the instructions.

According to an exemplary embodiment of the present disclosure, the processor may produce a lattice including a specified size based on a 3D point corresponding to a surface of the door, and may set, as the collision sensing zone, a space defined from a point, which is spaced from a 3D point corresponding to the surface of the door by an offset, to a point spaced from the 3D point corresponding to the surface of the door by a specified sensing range, in the space corresponding to the lattice, when executing the instructions.

According to an exemplary embodiment of the present disclosure, the processor may produce a plurality of lattices having the predetermined size based on a plurality of 3D points corresponding to the surface of the door and may warn the collision of the door, when the 3D points corresponding to the obstacle are present in at least the specified number in the collision sensing zone of at least one lattice of the plurality of lattices, when executing the instructions.

According to an exemplary embodiment of the present disclosure, the processor is configured to determine a number of 3D points corresponding to the obstacle entering the collision sensing zone for a specified time, may determine a variation in the number determined for the specified time, and may determine the collision possibility of the door, based on the variation, when executing the instructions.

According to an exemplary embodiment of the present disclosure, the processor is configured to determine the collision possibility of the door as being present, when the variation is equal to or greater than a specified value, when executing the instructions.

According to an exemplary embodiment of the present disclosure, the vehicle control apparatus may further include a speaker. The processor is configured to output a warning sound through the speaker, when determining the collision possibility as being present, when executing the instructions.

According to an exemplary embodiment of the present disclosure, the camera may include at least one of a mono-camera or a stereo-camera.

According to another aspect of the present disclosure, a method for controlling a vehicle may include obtaining an image of a surrounding of a door of a vehicle, which is captured through a camera, obtaining depth information from the obtained image, transforming the depth information into 3D point information, determining collision possibility of the door by determining the collision possibility of the door with the obstacle, based on distribution of the 3D point information, and warning the collision of the door when the collision possibility is determined as being present.

According to an exemplary embodiment of the present disclosure, the transforming of the depth information into the 3D point information may include obtaining the 3D point information by use of the depth information and a parameter of the camera, and the parameter may include a focal length and coordinates of a principal point.

According to an exemplary embodiment of the present disclosure, the obtaining of the 3D point information is performed through following Equation 1, Equation 2, and Equation 3, $$x=((px-cx)/fx)\cdot pz,\quad\text{Equation 1,}$$

$$y=((py-cy)/fy)\cdot pz,\text{ and}\quad\text{Equation 2,}$$

$$z=pz,\quad\text{Equation 3,}$$

in which 'x', 'y', and 'z' represent coordinates of a 3D point, 'px' and 'py' represent coordinates of each pixel contained in the depth information, 'cx' and 'cy' represent coordinates of a principal point, and 'fx' and 'fy' represent focal lengths, and 'pz' represents a depth value predicted with respect to the pixel.

According to an exemplary embodiment of the present disclosure, the determining of the collision possibility may setting a collision sensing zone for the door by use of the 3D point information, and determining the number of 3D points corresponding to the obstacle entering the collision sensing zone. The warning of the colliding of the door may include determining whether the determined number is equal to or greater than a specified number.

According to an exemplary embodiment of the present disclosure, the setting of the collision sensing zone may include producing a lattice including a specified size based on a 3D point corresponding to the surface of the door, and setting, as the collision sensing zone, a space defined from a point, which is spaced from the 3D point corresponding to the surface of the door by an offset, to a point spaced from the 3D point corresponding to the surface of the door by a predetermined sensing range, in a space corresponding to the lattice.

According to an exemplary embodiment of the present disclosure, the producing of the lattice may include producing a plurality of lattices including the specified size based on a plurality of 3D points corresponding to the surface of the door, and the warning of the collision of the door may include determining whether the 3D points corresponding to the obstacle are present in at least the specified number in the collision sensing zone of at least one lattice of the plurality of lattices.

According to an exemplary embodiment of the present disclosure, the method for controlling the vehicle may further include determining the number of 3D points corresponding to the obstacle entering the collision sensing zone for a specified time, determining a variation in the number determined for the specified time, and determining the collision possibility of the door, based on the variation.

According to an exemplary embodiment of the present disclosure, the determining of the collision possibility may include determining the collision possibility of the door as being present, when the variation is equal to or greater than a specified value.

According to an exemplary embodiment of the present disclosure, the warning of the collision of the door may include outputting a warning sound through a speaker.

According to an exemplary embodiment of the present disclosure, the camera may include at least one of a mono-camera or a stereo-camera.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
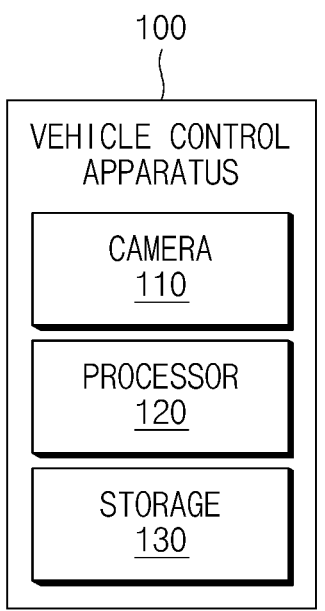
FIG. 1 is a block diagram illustrating the component of an apparatus of controlling a vehicle, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

Furthermore, in the following description of components according to an exemplary embodiment of the present disclosure, the terms "first", "second", 'A', 'B', '(a)', and '(B)' may be used. These terms are merely intended to distinguish one component from another component, and the terms do not limit the nature, sequence or order of the constituent components. Furthermore, unless otherwise defined, all terms used herein, including technical or scientific terms, have a same meanings as those generally understood by those skilled in the art to which the present disclosure pertains. Such terms as those defined in a generally used dictionary are to be interpreted as including meanings equal to the contextual meanings in the relevant field of art, and are not to be interpreted as including ideal or excessively formal meanings unless clearly defined in the present application.

Hereinafter, various embodiments of the present disclosure will be described in detail with reference to FIGS. 1 to 6.

FIG. 1 is a block diagram illustrating the component of an apparatus of controlling a vehicle, according to an exemplary embodiment of the present disclosure.

Referring to FIG. 1, according to an exemplary embodiment of the present disclosure, an apparatus (or a vehicle control apparatus) 100 may include a camera 110, a processor 120, and a storage 130. The camera 110, the processor 120, and the storage 130 may be operatively connected to each other.

The camera 110 may photograph an external portion of the vehicle. For example, the camera 110 may photograph a surrounding of a door of the vehicle. The camera 110 may include at least one of a mono camera or a stereo camera. The camera 110 may include a plurality of cameras.

The processor 120 may be electrically connected to the camera 110 or the storage 130, may electrically control each component, and may be an electric circuit that executes software commands. Accordingly, the processor 120 may process and determine various data to be described below. The processor 120 may be, for example, an electronic control unit (ECU), a micro controller unit (MCU), or another lower-level controller.

The storage 130 may store commands executed by the processor 120. The storage 130 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The processor 120 may perform operations, which are to be described below, as the processor 120 executes the commands stored in the storage 130.

The processor 120 may obtain an image of a surrounding of a door (vehicle door) of the vehicle, which is captured using the camera 110. The processor 120 may obtain an image captured through the camera 110 in a specific period. The obtained image may be at least one of a two dimensional (2D) image, a three dimensional (3D) image, or the combination thereof.

The processor 120 may obtain depth information from the obtained image. For example, the processor 120 may generate a depth map, which represents the distance for each of pixels of an image, which is generated through a deep-learning-based depth estimating algorithm or geometric information based on the obtained image. The depth map may include a plurality of pixels, and may include a depth value estimated with respect to each pixel. The depth map may be referred to as depth information or a distance map.

The processor 120 may transform the depth information into 3D point information. The processor 120 may obtain the 3D point information, by use of the depth information and a parameter of the camera 110. For example, the processor 120 may transform the depth information into the 3D point information, by use of coordinates of each pixel, a depth value estimated with respect to each pixel, and an internal camera parameter, which are included in the depth map. The internal camera parameter may include, for example, a focal length, and coordinates of a principal point. 3D points corresponding to the transformed 3D point information may be distributed on a 3D space. The 3D point information may be referred to as a 3D point set or a 3D point cloud.

For example, the processor 120 may obtain the 3D point information through Equation 1, Equation 2, and Equation 3.

$$x = \frac{px - cx}{fx} \times pz \qquad \text{Equation 1}$$

$$y = \frac{py - cy}{fy} \times pz \qquad \text{Equation 2}$$

$$z = pz \qquad \text{Equation 3}$$

In Equation 1, Equation 2, and Equation 3, 'x', 'y', and 'z' indicate coordinates of a 3D point, 'px' and 'py' indicate coordinates of a pixel in the depth map, 'pz' indicates a depth value estimated with respect to each pixel, and 'fx' and 'fy' indicate the focal length of the camera, and 'cx' and 'cy' indicate a principal point of the camera.

The processor 120 may determine the possibility, in which the vehicle door collides with the obstacle outside the vehicle, based on the distribution of the 3D point. The processor 120 may determine the collision possibility based on the determined result. The processor 120 may set a collision sensing zone for the door by use of the 3D point information to determine the collision possibility. For example, the processor 120 may remove remaining points of the 3D points except for the point present on the door surface, and may produce a lattice based on the 3D point, which is not removed, corresponding to the surface of the door. The processor 120 may set the collision sensing zone based on the 3D point corresponding to the surface of the door. For example, the processor 120 may set, as the collision sensing zone, a space defined from a point, which is spaced from the 3D point corresponding to the surface of the door by an offset, to a point spaced from the 3D point corresponding to the surface of the door by a specified sensing distance, in the space corresponding to the lattice. The specified sensing distance is the maximum distance, which allows the sensing of the obstacle, from the surface of the vehicle door. The offset is a value set to prevent an error which is caused by noise of the depth information. For example, when the sensing range may be set to 20 cm, and the offset is set to 4 cm, the processor 120 may set, as the collision sensing zone, the space in 4 cm to 20 cm from the door surface of the vehicle.

The processor 120 may determine the number of 3D points corresponding to the obstacle entering the collision sensing zone. The processor 120 may determine the number of 3D points corresponding to the obstacle entering the collision sensing zone, for each frame of the image captured by the camera 110. For example, the position of the collision sensing zone or the position of the 3D points corresponding to the obstacle may be varied, as the vehicle door is open or closed or as the obstacle moves. Accordingly, the number of 3D points corresponding to the obstacle entering the collision sensing zone may be varied for each frame.

The processor 120 may warn the collision of the door, when the determined number of 3D points is equal to or greater than a specified number. For example, when a plurality of lattices are generated based on a plurality of 3D points corresponding to the surface of the vehicle door, and when the 3D points corresponding to the obstacle enters, in the specified number, the collision sensing zone of at least one lattice of the plurality of lattices, the processor 120 may determine the door as including the collision possibility with the obstacle and may warn the door collision with the obstacle. For example, when the vehicle control apparatus

100 includes a speaker, the processor 120 may output a warning sound through the speaker.

The processor 120 may determine the number of the 3D points corresponding to the obstacle entering the collision sensing zone for a specified time. The processor 120 may determine the variation in the determined number for the specified time. The processor 120 may determine the collision possibility of the door, based on the variation. For example, when the obstacle approaches the vehicle door, the number of 3D points corresponding to the obstacle entering the collision sensing zone for the specified time may be increased. The processor 120 may determine an increment in the number of 3D points corresponding to the obstacle entering the collision sensing zone for the specified time. The determined increment may be a rate of increasing the number of 3D points corresponding to the obstacle entering the collision sensing zone. The determined increment may be a speed of the obstacle approaching the door. When the speed of the obstacle approaching the door is increased, the collision possibility between the two objects (the obstacle and the door) may be increased. The processor 120 may determine the collision possibility of the door as being present, when the variation is equal to or greater than a specified value.

The processor 120 may determine the collision possibility of the door by considering both the number of 3D points corresponding to the obstacle entering the collision sensing zone and the variation in the number of 3D points corresponding to the obstacle entering the collision sensing zone for the specified time. The processor 120 may more exactly estimate the collision possibility by considering the variation together.

Figure 2:
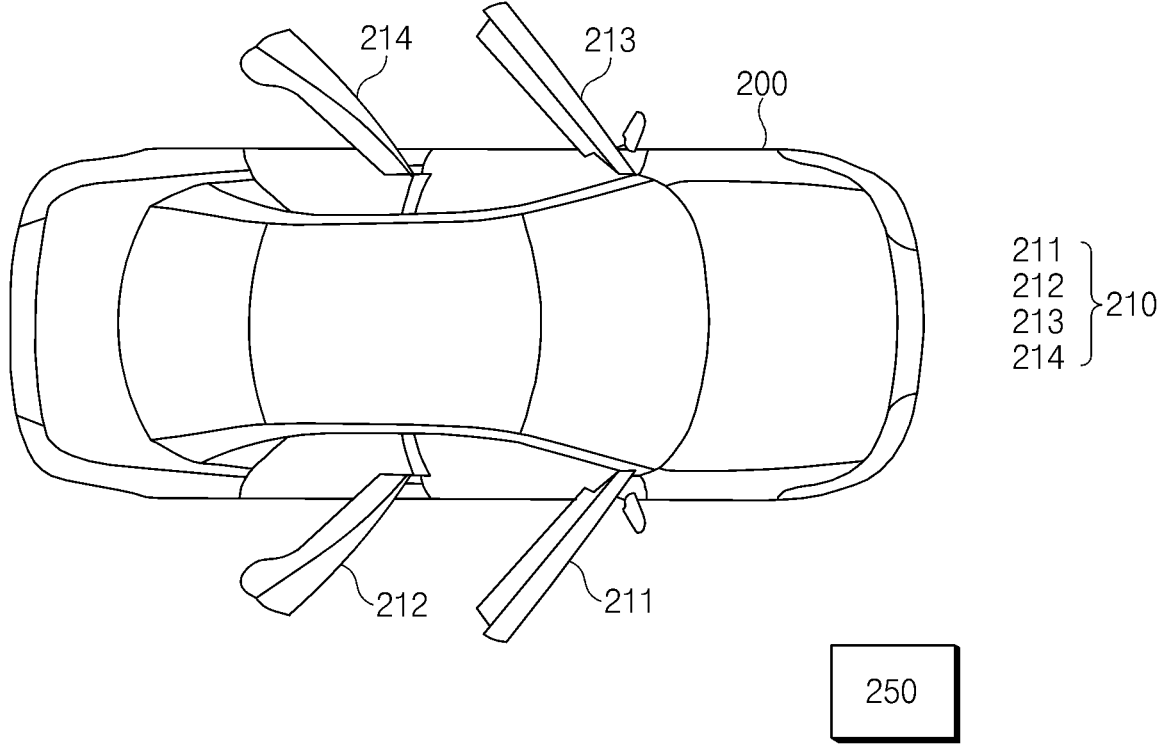
FIG. 2 is a view exemplarily illustrating a vehicle employing an apparatus of controlling a vehicle, according to an exemplary embodiment of the present disclosure.

FIG. 2 is a view exemplarily illustrating a vehicle employing a vehicle control apparatus, according to an exemplary embodiment of the present disclosure.

Referring to FIG. 2, a vehicle 200 may include a door 210. The door 210 may include a first door 211, a second door 212, a third door 213, and a fourth door 214, but the present disclosure is not limited thereto. For example, the number, size, and position of the door may be varied depending on vehicle types. The vehicle 200 may include the vehicle control apparatus 100 of FIG. 1

The camera 110 of the vehicle control apparatus 100 may capture a surrounding of the door 210 of the vehicle 200. For example, the camera 110 may capture each of the first door 211, the second door 212, the third door 213, and the fourth door 214, or at least two doors of the first door 211, the second door 212, the third door 213, and the fourth door 214. The vehicle control apparatus 100 may determine the collision possibility of the door 210 with an obstacle 250 present outside the vehicle 200, based on the image of the surrounding of the door 210, which is captured through camera 110, and may determine whether the collision possibility is present.

The vehicle control apparatus 100 may obtain a depth map (or a distance map) by processing the image captured using the camera 110, and may transform a predicted depth value (or a predicted distance value) included in the depth map into a 3D point cloud using the internal camera parameter. The vehicle control apparatus 100 may determine the collision possibility of the door 210 with the obstacle 250 using the distribution of the transformed 3D point cloud, and may determine whether the collision possibility is present.

Meanwhile, when the image captured by the camera 110 includes a plurality of images captured at various angles, the vehicle control apparatus 100 may obtain a depth map with respect to each of the images and may transform the depth information included in the depth map into the 3D point information.

The vehicle control apparatus 100 may set the collision sensing zone for the surface of the door 210 of the vehicle 200 by use of the 3D point information. The vehicle control apparatus 100 may set the collision sensing zone for each of the doors (e.g., the first door 211, the second door 212, the third door 213, and the fourth door 214).

The vehicle control apparatus 100 may determine the number of the 3D points corresponding to the obstacle entering the collision sensing zone for a specified time. The vehicle control apparatus 100 may warn the collision of the door 210, when the determined number of 3D points is equal to or greater than a specified number. For example, when the number of the 3D points corresponding to the obstacle entering the collision sensing zone 211 is equal to or greater than the specified number, the vehicle control apparatus 100 may warn the collision of the first door 211. For example, the vehicle control apparatus 100 may output a warning sound through a speaker and/or may output a warning message to notify the collision of the first door 211 through the display. For another example, the vehicle control apparatus 100 may perform a control operation to stop opening or closing the first door 211.

Hereinafter, a method for setting the collision sensing zone according to an exemplary embodiment of the present disclosure will be in detail described with reference to FIG. 3.

Figure 3:
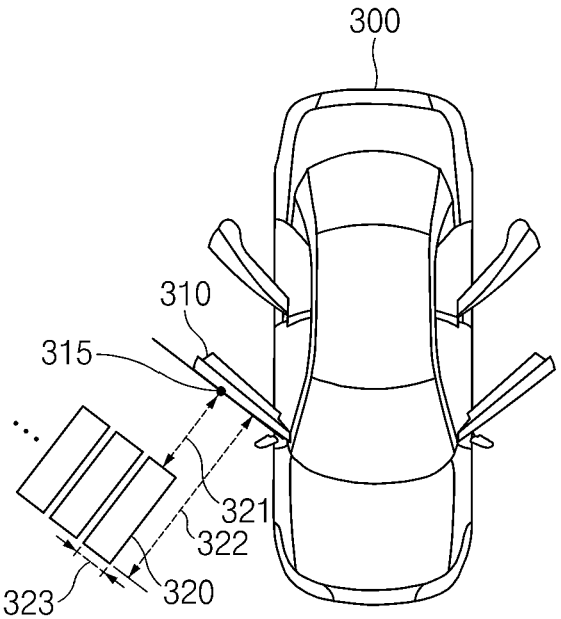
FIG. 3 is a view to explain a method for setting a collision sensing zone, according to an exemplary embodiment of the present disclosure.

FIG. 3 is a view to explain a method for setting the collision sensing zone according to an exemplary embodiment of the present disclosure.

Referring to FIG. 3, a vehicle 300 may include a door 310. The vehicle 300 may include the vehicle control apparatus 100 of FIG. 1 The vehicle control apparatus 100 may obtain an image of a surrounding of the door 310 using the camera 110, and may obtain depth information from the obtained image. The vehicle control apparatus 100 may transform the depth information into 3D point information. The vehicle control apparatus 100 may set a collision sensing zone 320 from a 3D point 315, which corresponds to the surface of the door 310, of 3D points contained in the 3D point information.

The vehicle control apparatus 100 may produce a lattice including a specified size 323 based on the 3D point 315 corresponding to the surface of the door 310. The vehicle control apparatus 100 may set, as the collision sensing zone 320, a space defined from a point, which is spaced from the 3D point 315 corresponding to the surface of the door 310 by an offset 321, to a point spaced from the 3D point 315 corresponding to the surface of the door 310 by a specified sensing range 322, in the space corresponding to the lattice. Although FIG. 3 illustrates a plan view of the collision sensing zone 320 when viewed from the top portion of the vehicle 300, the collision sensing zone 320 corresponds to a cubic space.

The vehicle control apparatus 100 may set the collision sensing zone with respect to a plurality of 3D points corresponding to the surface of the door 310. The collision sensing zone for the door 310 may include at least a portion (e.g., a space defined from the surface of the door 310 to a sensing range 322 specified from a point spaced by an offset) of a space corresponding to the plurality of lattices produced based on a plurality of 3D points corresponding to the surface of the door 310.

Figure 4:
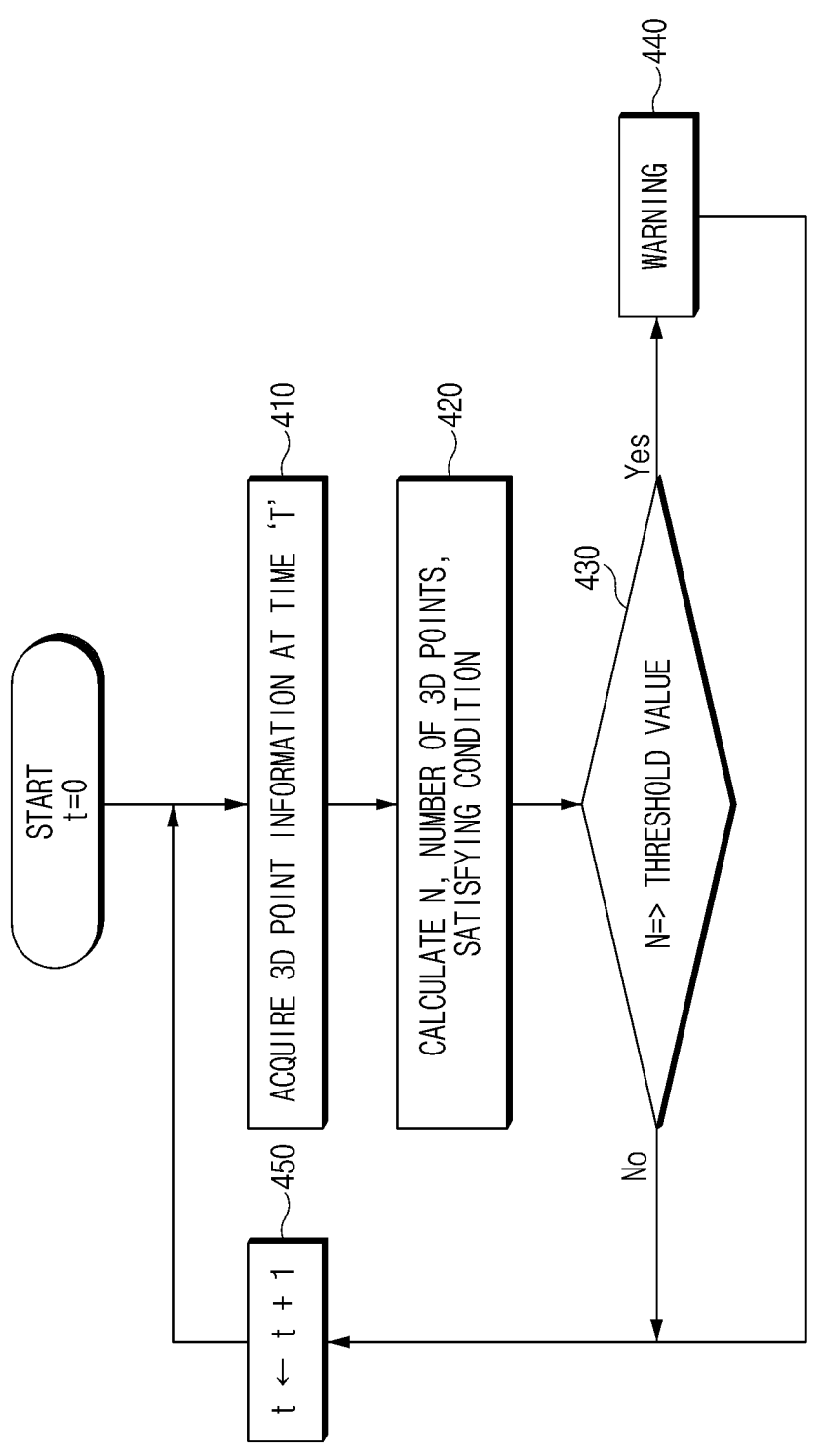
FIG. 4 is a flowchart illustrating a collision sensing algorithm, according to an exemplary embodiment of the present disclosure.

FIG. 4 is a flowchart illustrating a collision sensing algorithm, according to an exemplary embodiment of the present disclosure. The collision sensing algorithm to be described below may be performed by the vehicle control apparatus 100 of FIG. 1 or the processor 120 of the vehicle control apparatus 100.

Referring to FIG. 4, the vehicle control apparatus 100 may start the collision sensing algorithm when time T='0'.

In operation 410, the vehicle control apparatus 100 may obtain 3D point information at time T. The vehicle control apparatus 100 may obtain depth information from the image captured by the camera 110 at the time T and may transform the obtained depth information into the 3D point information. The vehicle control apparatus 100 may obtain the 3D point information based on Equation 1, Equation 2, and Equation 3 described above with reference to FIG. 1.

The vehicle control apparatus 100 may set the collision sensing zone by use of the obtained 3D point information obtained in operation 410. The method for setting the collision sensing zone has been described with reference to FIG. 3. Accordingly, the duplication thereof will be omitted.

In operation 420, the vehicle control apparatus 100 may determine 'N' which is the number of 3D points, satisfying a condition. In the instant case, the condition may be that the 3D points corresponding to the obstacle are positioned in the collision sensing zone. The vehicle control apparatus 100 may determine 'N' which is the number of the 3D points corresponding to the obstacle positioned in the collision sensing zone.

In operation 430, the vehicle control apparatus 100 may determine whether 'N' is equal to or greater than a threshold value. When 'N' is equal to or greater than the threshold value, the vehicle control apparatus 100 may perform operation 440 and operation 450. When 'N' is less than the threshold value, the vehicle control apparatus 100 may perform operation 450 without performing operation 440.

In operation 440, the vehicle control apparatus 100 may warn the collision of the door. For example, the vehicle control apparatus 100 may output a warning sound through the speaker. The vehicle control apparatus 100 may perform operation 450 after performing operation 440.

In operation 450, the vehicle control apparatus 100 may increase the time T by '1'. The vehicle control apparatus 100 may repeat the above operations from operation 410 after performing operation 450. The vehicle control apparatus 100 may repeatedly perform the algorithm illustrated in FIG. 4. For example, the vehicle control apparatus 100 may perform the algorithm for each frame of the image captured through the camera 110.

Figure 5:
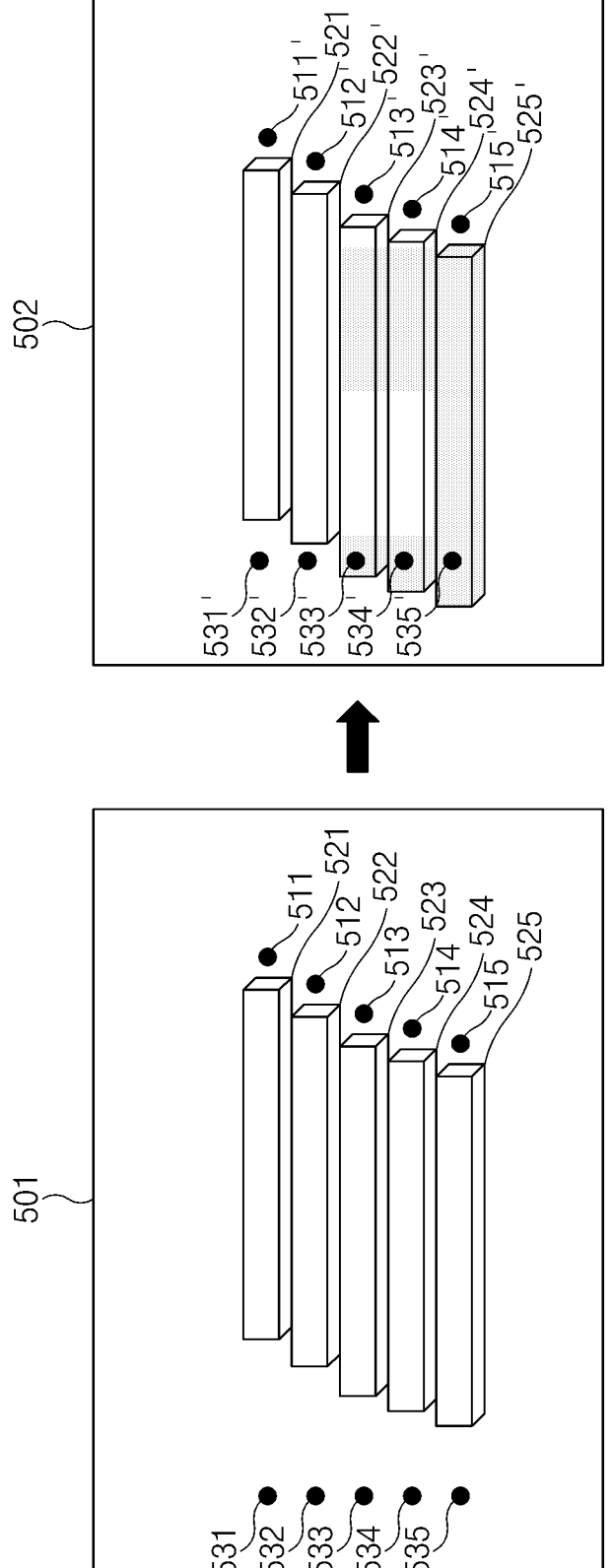
FIG. 5 is a view exemplarily illustrating a method for determining the collision possibility, according to an exemplary embodiment of the present disclosure.

FIG. 5 is a view to explain a method for determining the collision possibility, according to an exemplary embodiment of the present disclosure. The method for determining the collision possibility to be described below may be performed by the vehicle control apparatus 100 of FIG. 1 or the processor 120 of the vehicle control apparatus 100.

Referring to FIG. 5, for example, the vehicle control apparatus 100 may obtain 3D point information 501 at a time point 't1'. The 3D point information 501 at time point 't1' may include a plurality of 3D points 511, 512, 513, 514, and 515 corresponding to the surface of the door and a plurality of 3D points 531, 532, 533, 534, and 535 corresponding to an obstacle. The vehicle control apparatus 100 may produce a plurality of lattices, based on the plurality of 3D points 511, 512, 513, 514, and 515 corresponding to the surface of the door. For example, the vehicle control apparatus 100 may set, as the collision sensing zone 521, 522, 523, 524, or 525, a space defined from a point, which is spaced from the 3D point 511, 512, 513, 514, or 515 corresponding to the surface of the door by an offset, to a point spaced from the 3D point 511, 512, 513, 514, or 515 corresponding to the surface of the door by a specified sensing range, in the space corresponding to each lattice.

The vehicle control apparatus 100 may warn the collision of the door, when 3D points corresponding to an obstacle are present in at least a specified number in the collision sensing zone of at least one lattice of the plurality of lattices. Referring to FIG. 5, the number of 3D points corresponding to the obstacle and present in the collision sensing zone may be zero at the time point 't1'. For example, the number of 3D points, which is configured as a reference for determining the collision possibility of the door by the vehicle control apparatus 100, may be set to two. As illustrated in FIG. 5, the vehicle control apparatus 100 may determine that the number of the 3D points corresponding to the obstacle is less than a specified number (two) in the collision sensing zone at the time point 't1' and may determine the collision possibility as being absent.

The vehicle control apparatus 100 may obtain 3D point information 502 at a time point 't2' after the time point 't1'. For example, as the door is open or closed, or as the obstacle moves, the 3D point information 502 at the time point 't2' may differ from the 3D point information 502 at the time point 't1'. The 3D point information 502 at time point 't2' may include a plurality of 3D points 511', 512', 513', 514', and 515' corresponding to the surface of the door and a plurality of 3D points 531', 532', 533', 534', and 535' corresponding to an obstacle. The vehicle control apparatus 100 may produce a plurality of lattices, based on the plurality of 3D points 511', 512', 513', 514', and 515' corresponding to the surface of the door. For example, the vehicle control apparatus 100 may set, as the collision sensing zone 521', 522', 523', 524', or 525', a space defined from a point, which is spaced from the 3D point 511', 512', 513', 514', or 515' corresponding to the surface of the door by an offset, to a point spaced from the 3D point 511', 512', 513', 514', or 515' corresponding to the surface of the door by a specified sensing range, in the space corresponding to each lattice.

Referring to FIG. 5, the number of 3D points corresponding to the obstacle and present in the collision sensing zone may be three at the time point 't2'. As illustrated in FIG. 5, the vehicle control apparatus 100 may determine that the number of the 3D points corresponding to the obstacle is equal to or greater than the specified number (two) in the collision sensing zone at the time point 't2' and may determine the collision possibility as being present.

Figure 6:
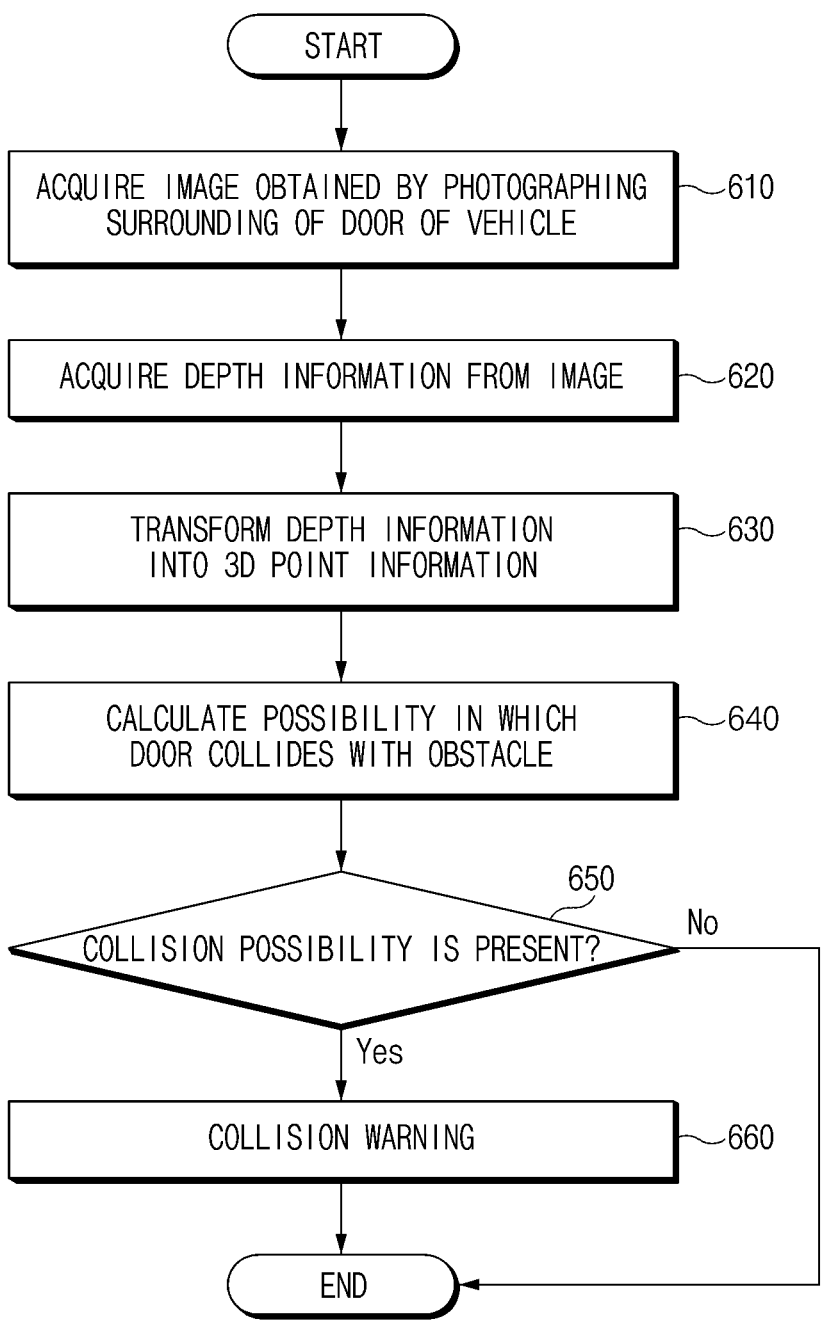
FIG. 6 is a flowchart illustrating a method for controlling a vehicle, according to another exemplary embodiment of the present disclosure.

Hereinafter, a method for controlling a vehicle according to another exemplary embodiment of the present disclosure will be described in detail with reference to FIG. 6. FIG. 6 is a flowchart illustrating the method for controlling the vehicle, according to another exemplary embodiment of the present disclosure.

Hereinafter, it is assumed that the vehicle control apparatus 100 of FIG. 1 performs a process of FIG. 6. Furthermore, in the following description made with reference to FIG. 6, it may be understood that the operation referred to as being performed by the vehicle control apparatus 100 is controlled by the processor 120 of the vehicle control apparatus 100.

In operation 610, the vehicle control apparatus 100 may obtain an image obtained by capturing a surrounding of a vehicle door. The vehicle control apparatus 100 may obtain an image of a surrounding of a vehicle (e.g., the vehicle 200 of FIG. 2 or the door (e.g., the door 210 of FIG. 2 or the door 310 of FIG. 3) of the vehicle 300 of FIG. 3) through the camera 110. The camera 110 may include at least one of a mono camera or a stereo camera.

In operation 620, the vehicle control apparatus 100 may obtain depth information from the image. The vehicle control apparatus 100 may obtain the depth information from the image captured through the camera 110. For example, the depth information may be a depth map, which represents the distance for each of pixels of an image, which is generated through a deep-learning-based depth estimating algorithm or geometric information based on the obtained image.

In operation 630, the vehicle control apparatus 100 may transform the depth information into 3D point information. The vehicle control apparatus 100 may obtain the 3D point information, by use of the depth information and a parameter of the camera 110. The parameter, which is an internal parameter of the camera, may include, for example, a focal distance and coordinates of a principal point. For example, the vehicle control apparatus 100 may transform the depth information into the 3D point information, by use of coordinates of each pixel contained in depth information, a depth value estimated with respect to each pixel, and an internal camera parameter, which are included in the depth map. The 3D point information may include coordinates of the plurality of 3D points. The coordinates of the plurality of 3D points may be determined through Equation 1, Equation 2, and Equation 3.

In operation 640, the vehicle control apparatus 100 may determine the collision possibility of a door with an obstacle (e.g., the obstacle 250 of FIG. 2). The vehicle control apparatus 100 may determine the collision possibility of the door with the vehicle. The vehicle control apparatus 100 may set the collision sensing zone for the door by use of the 3D point information. For example, the vehicle control apparatus 100 may produce a lattice having a specified size based on a 3D point corresponding to the surface of the door, and may set, as the collision sensing zone, a space defined from a point, which is spaced from the 3D point corresponding to the surface of the door by an offset, to a point spaced from the 3D point corresponding to the surface of the door by a specified sensing range, in the space corresponding to the lattice. The offset is a value set to prevent an error which is caused by noise of the depth information. The specified sensing range is the maximum distance, which allows the sensing of the obstacle, from the surface of the vehicle door. The vehicle control apparatus 100 may produce a plurality of lattices having the specified size based on the plurality of 3D points corresponding to the surface of the door. The vehicle control apparatus 100 may determine the collision possibility of the door by determining the number of the 3D points corresponding to the obstacle entering the collision sensing zone. The vehicle control apparatus 100 may determine the number of the 3D points corresponding to the obstacle entering the collision sensing zone of at least one lattice of the plurality of lattices.

In operation 650, the vehicle control apparatus 100 may determine the collision possibility. The vehicle control apparatus 100 may determine the collision possibility as being present, when the determined number of 3D points determined in operation 640 is equal to or greater than the specified number. The vehicle control apparatus 100 may determine the collision possibility as being absent, when the determined number of 3D points is less than the specified number. The vehicle control apparatus 100 may determine whether 3D points corresponding to an obstacle are present in at least a specified number in the collision sensing zone of at least one lattice of the plurality of lattices. The vehicle control apparatus 100 may determine the collision possibility as being present, when the 3D points corresponding to the obstacle are present in at least the specified number in the collision sensing zone of at least one lattice of the plurality of lattices. The vehicle control apparatus 100 may perform operation 660, when the collision possibility of the door with the obstacle is determined as being present.

In operation 660, the vehicle control apparatus 100 may warn the collision. The vehicle control apparatus 100 may warn the collision of the door, when the collision possibility of the door with the obstacle is determined as being present. For example, the vehicle control apparatus 100 may output a warning sound through the speaker. For another example, the vehicle control apparatus 100 may output the warning message to warn the collision of the door through the display. For another example, the vehicle control apparatus 100 may control the vehicle so that the door is stopped being open or closed.

According to various exemplary embodiments of the present disclosure, the vehicle control apparatus 100 may determine the number of 3D points corresponding to the obstacle entering the collision sensing zone for the specified time, may determine the variation in number determined for the specified time, and may determine the collision possibility of the door, based on the variation. The variation may refer to a speed of the obstacle approaching the door. For example, as the speed of the obstacle approaching the door is increased, the collision possibility between the two objects (the obstacle and the door) may be increased. The vehicle control apparatus 100 may determine the collision possibility of the door as being present, when the variation is equal to or greater than a specified value.

The vehicle control apparatus 100 may determine the collision possibility of the door, based on the number of 3D points corresponding to the obstacle entering the collision sensing zone at an arbitrary time point and may determine the collision possibility of the door, based further on the variation in the number of 3D points corresponding to the obstacle entering the collision sensing zone for the specified time. The vehicle control apparatus 100 may more exactly estimate the collision possibility of the door by additionally considering the variation.

Figure 7:
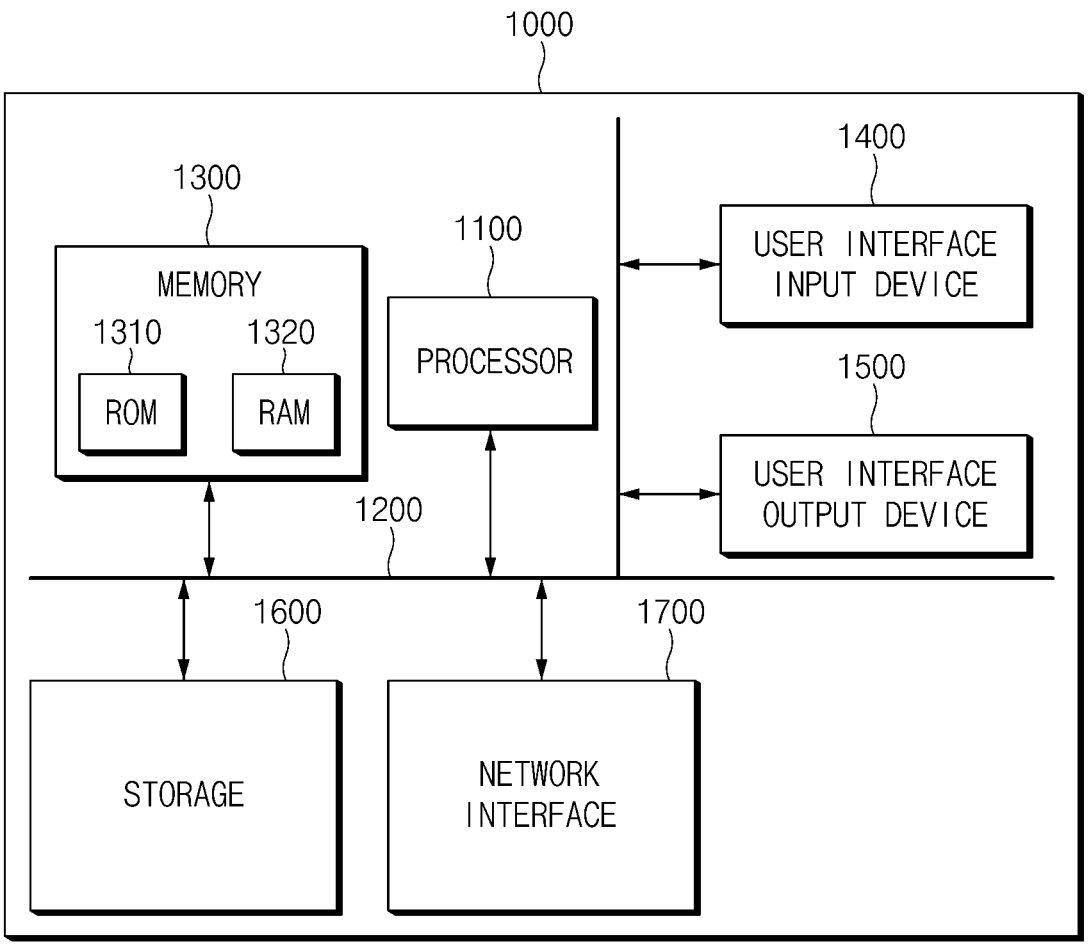
FIG. 7 illustrates a computing system, according to an exemplary embodiment of the present disclosure.

FIG. 7 illustrates a computing system, according to an exemplary embodiment of the present disclosure.

Referring to FIG. 7, according to an exemplary embodiment of the present disclosure, the method for controlling the vehicle by a vehicle control apparatus (e.g., the vehicle control apparatus 100 of FIG. 1) may be implemented by a computing system 1000. The computing system 1000 may include at least one processor 1100, a memory 1300, a user interface input device 1400, a user interface output device 1500, storage 1600, and a network interface 1700, which are connected to each other through a system bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments included in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, the present disclosure may provide an apparatus of controlling a vehicle, configured for exactly estimating the depths of a door and an obstacle through a camera and preventing the collision between the door and the obstacle, and a method for the same.

Furthermore, the present disclosure may provide an apparatus of controlling a vehicle, configured for ensuring the security of an occupant and a pedestrian, when a door of a vehicle employing a power swing door technology is open or closed, and of reducing an accident rate when the occupant gets on or off, and a method for the same.

The present disclosure may provide an apparatus of controlling a vehicle, configured for more exactly predicting the collision possibility of the door and the obstacle, and a method for the same.

Besides, a variety of effects directly or indirectly understood through the present disclosure may be provided.

The above description is merely an example of the technical idea of the present disclosure, and various modifications and modifications may be made by one skilled in the art without departing from the essential characteristic of the present disclosure.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of controlling a vehicle, the apparatus comprising:

a camera;

a processor operatively connected to the camera; and a storage operatively connected to the processor and configured to store instructions executed by the processor, wherein, when executing the instructions, the processor is configured to:

obtain an image of a surrounding of a door of the vehicle, which is captured through the camera;

obtain depth information from the obtained image;

transform the depth information into three dimensional (3D) point information;

determine collision possibility of the door by determining the collision possibility of the door with an obstacle, based on distribution of the 3D point information; and warn collision of the door, when the collision possibility is determined as being present, and wherein, when executing the instructions, the processor is configured to:

set a collision sensing zone, having a predetermined size, wherein an endpoint of the collision sensing zone is spaced from a 3D point corresponding to a surface of the door by an offset;

determine a number of 3D points corresponding to the obstacle entering the collision sensing zone;

determine a variation in the number of 3D points corresponding to the obstacle entering the collision sensing zone during a period of time when a location of the collision sensing zone changes due to opening of the door; and warn collision of the door, when the variation is equal to or greater than a predetermined number.

2. The apparatus of claim 1, wherein, when executing the instructions, the processor is configured to:

obtain the 3D point information by use of the depth information and a parameter of the camera, and wherein the parameter includes a focal length and coordinates of a principal point.

3. The apparatus of claim 2, wherein, when executing the instructions, the processor is configured to:

obtain the 3D point information through following Equation 1, Equation 2, and Equation 3, $$x=((px-cx)/fx)pz,\qquad\text{Equation 1,}$$

$$y=((py-cy)/fy)pz, \text{ and}\qquad\text{Equation 2,}$$

$$z=pz, \text{ and}\qquad\text{Equation 3,}$$

wherein 'x', 'y', and 'z' represent coordinates of a 3D point, 'px' and 'py' represent coordinates of each pixel contained in the depth information, 'cx' and 'cy' represent coordinates of the principal point, 'fx' and 'fy' represent the focal length, and 'pz' represents a depth value predicted with respect to the pixel.

4. The apparatus of claim 1, wherein, when executing the instructions, the processor is configured to:

produce a lattice having the predetermined size, based on the 3D point corresponding to the surface of the door; and set, as the collision sensing zone, a space defined from a point, which is spaced from the 3D point corresponding to the surface of the door by the offset, to a point spaced from the 3D point corresponding to the surface of the door by a predetermined sensing range, in a space corresponding to the lattice.

5. The apparatus of claim 4, wherein, when executing the instructions, the processor is configured to:

produce a plurality of lattices having the predetermined size based on a plurality of 3D points corresponding to the surface of the door; and warn the collision of the door, when 3D points corresponding to the obstacle are present in at least the predetermined number in the collision sensing zone of at least one lattice of the plurality of lattices.

6. The apparatus of claim 1, wherein, when executing the instructions, the processor is configured to:

determine the collision possibility of the door as being present, when the variation is equal to or greater than a predetermined value.

7. The apparatus of claim 1, wherein the vehicle control apparatus further includes a speaker, and wherein, when executing the instructions, the processor is configured to:

output a warning sound through the speaker, when determining the collision possibility as being present.

8. The apparatus of claim 1, wherein the camera includes:

at least one of a mono-camera or a stereo-camera.

9. A method for controlling a vehicle, the method comprising:

obtaining, by a processor, an image of a surrounding of a door of the vehicle, which is captured through a camera;

obtaining, by the processor, depth information from the obtained image;

transforming, by the processor, the depth information into 3D point information;

determining, by the processor, collision possibility of the door by determining the collision possibility of the door with an obstacle, based on distribution of the 3D point information; and warning, by the processor, collision of the door, when the collision possibility is determined as being present, wherein the determining of the collision possibility includes:

setting a collision sensing zone, having a predetermined size, wherein an endpoint of the collision sensing zone is spaced from a 3D point corresponding to a surface of the door by an offset;

determining a number of 3D points corresponding to the obstacle entering the collision sensing zone, determine a variation in the number of 3D points corresponding to the obstacle entering the collision sensing zone during a period of time when a location of the collision sensing zone changes due to opening of the door, and determining the collision possibility of the door, based on the variation.

10. The method of claim 9, wherein the transforming of the depth information into the 3D point information includes:

obtaining the 3D point information by use of the depth information and a parameter of the camera, and wherein the parameter includes a focal length and coordinates of a principal point.

11. The method of claim 10, wherein the obtaining of the 3D point information is performed through following Equation 1, Equation 2, and Equation 3, $$x=((px-cx)/fx)\cdot pz,\qquad\text{Equation 1,}$$

US 12,561,985 B2

17

$$y=((py-cy)/fy)\cdot pz,\text{ and}\qquad\text{Equation 2,}$$

$$z=pz,\qquad\text{Equation 3,}$$

wherein 'x', 'y', and 'z' represent coordinates of a 3D point, 'px' and 'py' represent coordinates of each pixel contained in the depth information, 'cx' and 'cy' represent coordinates of a principal point, 'fx' and 'fy' represent focal lengths, and 'pz' represents a depth value predicted with respect to the pixel.

12. The method of claim 9, wherein the setting of the collision sensing zone includes:

producing a lattice having the predetermined size based on the 3D point corresponding to the surface of the door; and setting, as the collision sensing zone, a space defined from a point, which is spaced from the 3D point corresponding to the surface of the door by the offset, to a point spaced from the 3D predetermined point corresponding to the surface of the door by a predetermined sensing range, in a space corresponding to the lattice.

13. The method of claim 12, wherein the producing of the lattice includes:

producing a plurality of lattices having the predetermined size based on a plurality of 3D points corresponding to the surface of the door, and wherein the warning of the collision of the door includes:

determining whether 3D points corresponding to the obstacle are present in at least the predetermined number in the collision sensing zone of at least one lattice of the plurality of lattices.

14. The method of claim 9, wherein the determining of the collision possibility includes:

determining the collision possibility of the door as being present, when the variation is equal to or greater than a predetermined value.

15. The method of claim 9, wherein the warning of the collision of the door includes:

outputting a warning sound through a speaker.

16. The method of claim 9, wherein the camera includes:

at least one of a mono-camera or a stereo-camera.

* * * * *